United States Patent

Havens et al.

Patent Number: 5,818,556
Date of Patent: Oct. 6, 1998

[54] METHOD AND APPARATUS FOR PATTERNING ENCAPSULATED LIQUID CRYSTAL LAYERS

[75] Inventors: John R. Havens, Menlo Park; Binh Vu Cao, San Jose; Frank Wasilewski, Redwood City; Philip J. Jones, Menlo Park; Damoder Reddy, Irvine; Brackin L. Andrews, Menlo Park, all of Calif.

[73] Assignee: Raychem Corporation, Menlo Park, Calif.

[21] Appl. No.: 685,732

[22] Filed: Jul. 24, 1996

[51] Int. Cl.$^6$ ............................ G02F 1/137; G02F 1/1339
[52] U.S. Cl. ............................................... 349/92; 349/187
[58] Field of Search ............................ 349/86, 92, 187, 349/190; 430/20; 445/24, 25

[56] References Cited

U.S. PATENT DOCUMENTS

| | | | |
|---|---|---|---|
| 4,182,700 | 1/1980 | Benton et al. | 260/37 |
| 4,435,047 | 3/1984 | Fergason | 350/334 |
| 4,669,828 | 6/1987 | Parker | 350/339 R |
| 4,685,771 | 8/1987 | West et al. | 350/347 |
| 5,056,898 | 10/1991 | Ma et al. | 359/94 |
| 5,328,580 | 7/1994 | Reamey | 204/181.1 |
| 5,430,563 | 7/1995 | Bouteiller et al. | 359/51 |

FOREIGN PATENT DOCUMENTS

| | | | |
|---|---|---|---|
| 0 703 485 A2 | 3/1996 | European Pat. Off. | G02G 1/1341 |
| 42 02 194 A1 | 7/1993 | Germany | B44D 3/16 |
| 63-163423 | 7/1988 | Japan | 349/190 |
| WO 93/21555 | 10/1993 | WIPO | G02F 1/1333 |
| WO 96/13561 | 5/1996 | WIPO | C09K 19/54 |
| WO 96/20986 | 7/1996 | WIPO | C09K 19/54 |

OTHER PUBLICATIONS

Patent Abstracts of Japan vol. 012, No. 006 (P–653), 9 Jan. 1988 (abstract of JP 62–165622 (Seiko Epson)).

Patent Abstracts of Japan, vol. 009, No. 214 (P–384), 31 Aug. 1985 (abstract of JP 60–075817 (Sharp)).

WPI Abstract No. 94–077543/10 (abstract of JP 06027447 (Feb. 1994)).

*Primary Examiner*—William L. Sikes
*Assistant Examiner*—Tai V. Duong
*Attorney, Agent, or Firm*—Yuan Chao; Herbert G. Burkard

[57] ABSTRACT

An encapsulated liquid crystal layer is patterned by placing a mask into contact with a coated substrate. The mask is held against the substrate, for example, by a vacuum, to form a seal. The assembly is submerged in a solvent to dissolve the exposed region of the encapsulated liquid crystal material.

15 Claims, 7 Drawing Sheets

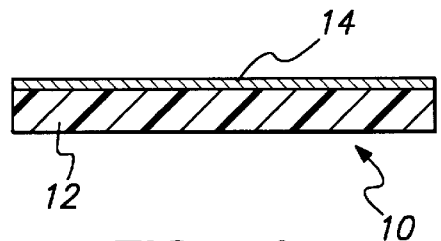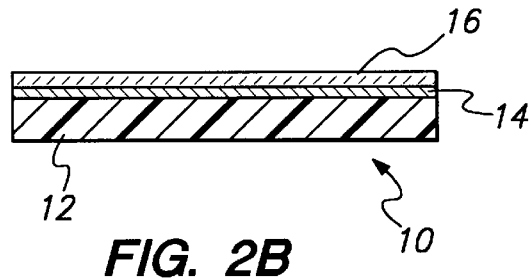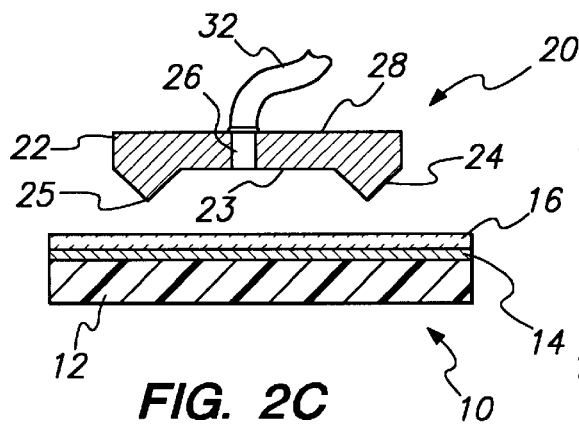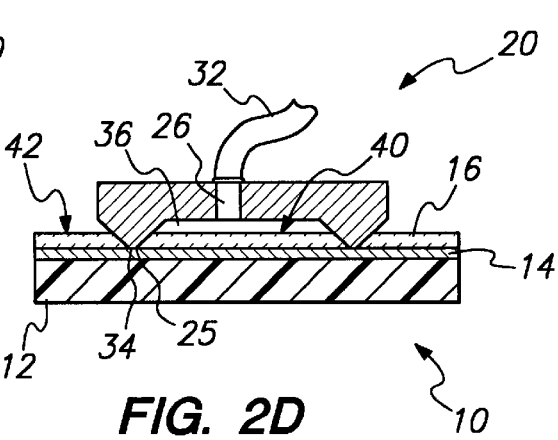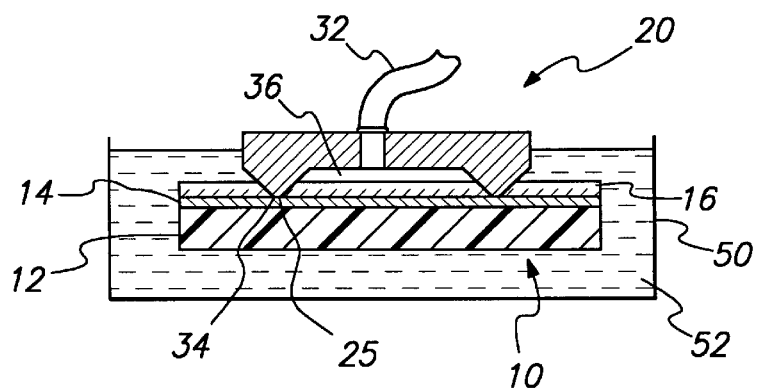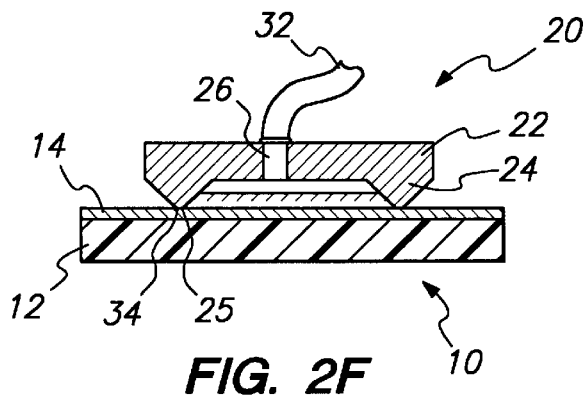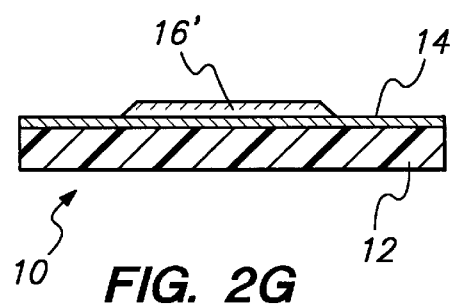

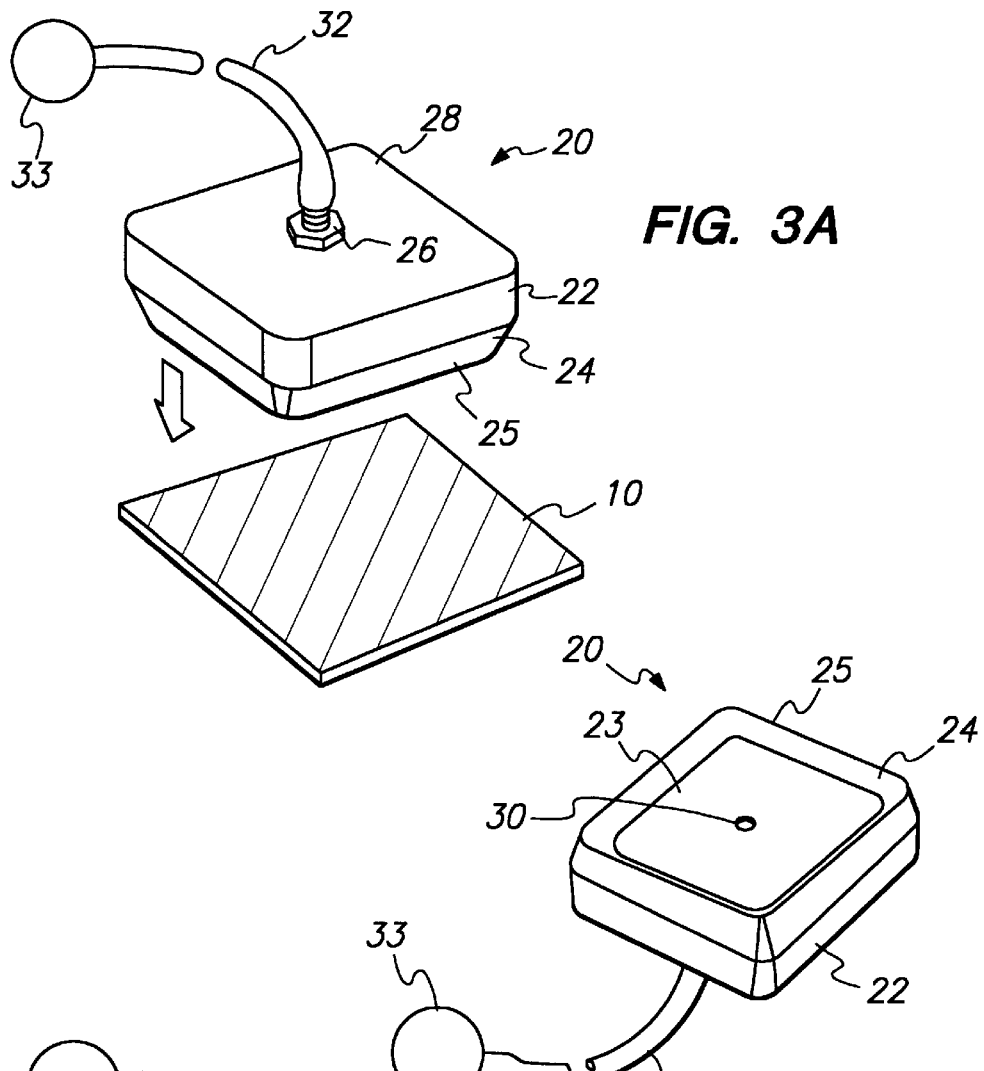
FIG. 3A
FIG. 3B
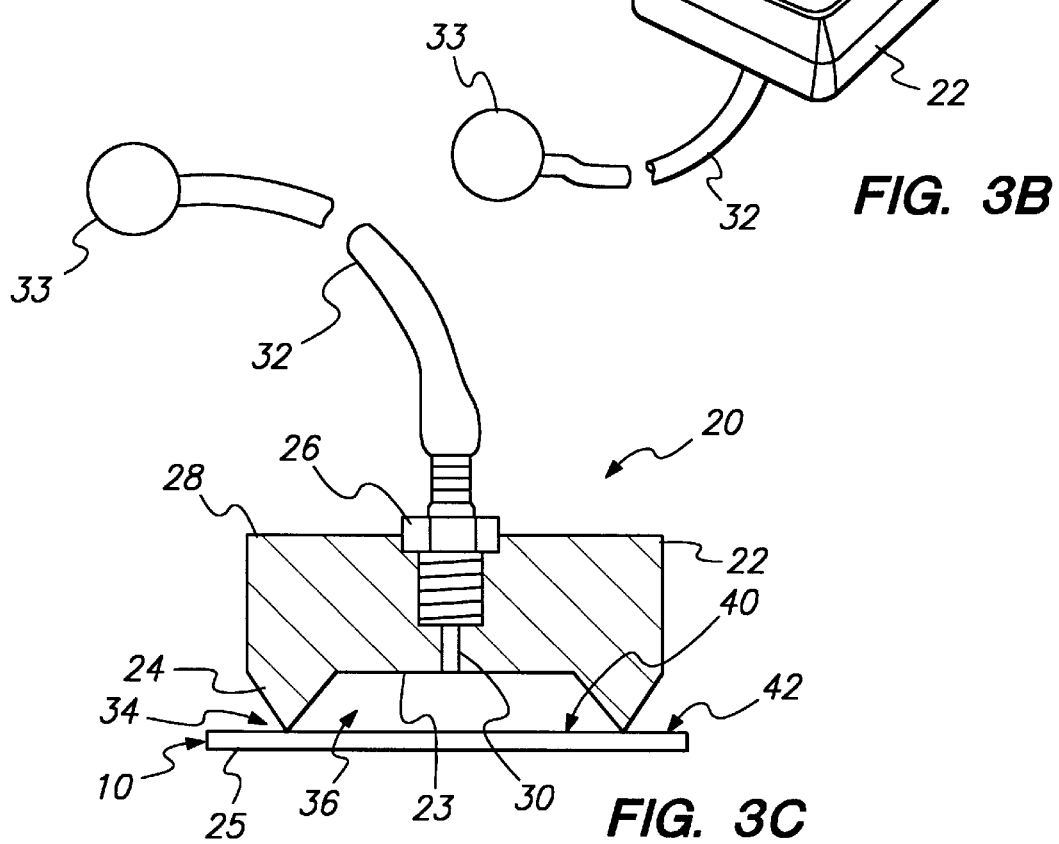
FIG. 3C

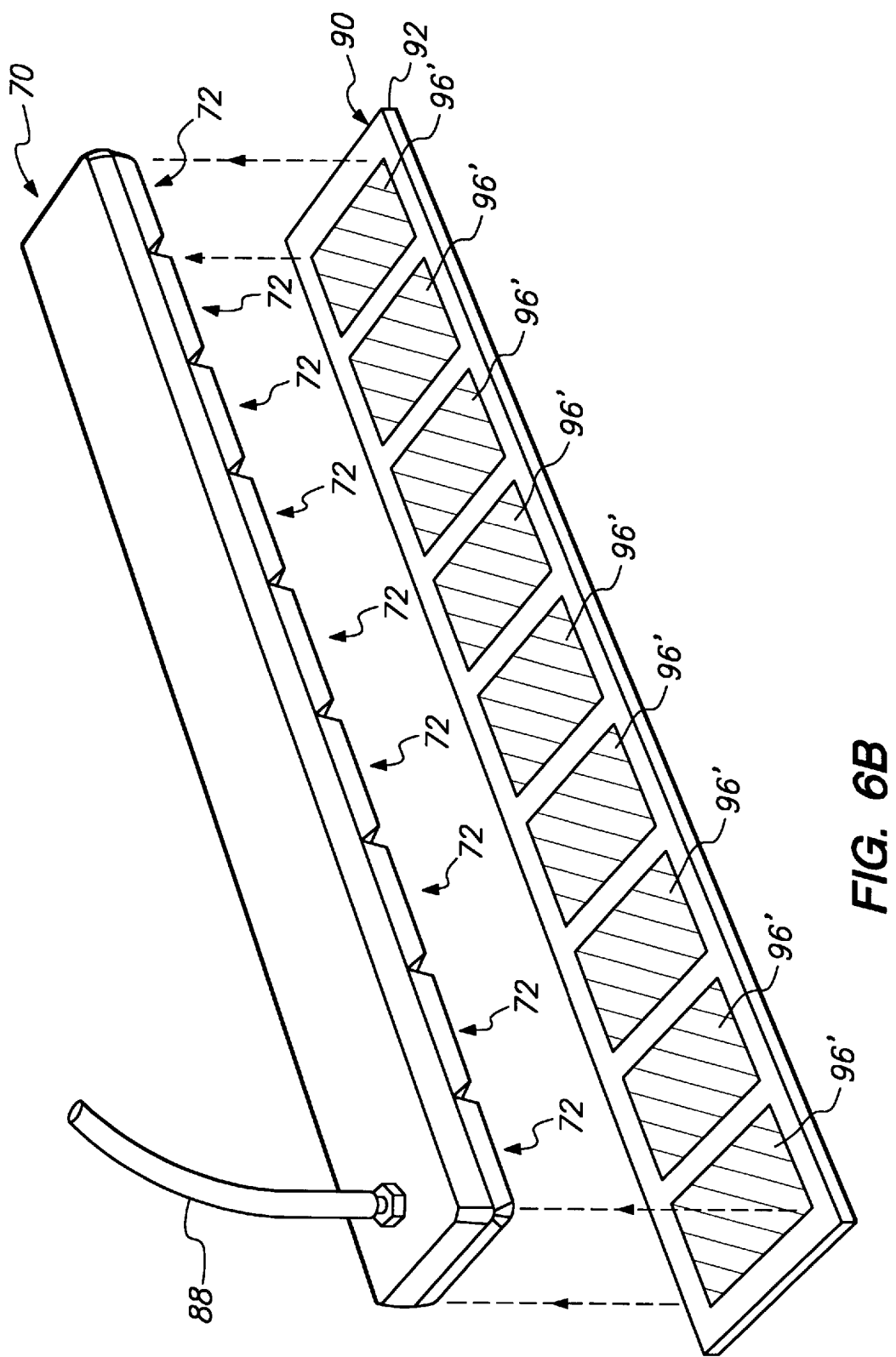

METHOD AND APPARATUS FOR PATTERNING ENCAPSULATED LIQUID CRYSTAL LAYERS

TECHNICAL FIELD OF THE INVENTION

The present invention relates generally to encapsulated liquid crystal material, and more particularly to a method of patterning a layer of encapsulated liquid crystal material.

BACKGROUND OF THE INVENTION

Liquid crystal materials are used in a wide variety of devices, including projection and direct view displays. As shown in FIG. 1A, a liquid crystal cell may include a layer of liquid crystal material sandwiched between two electrodes. Each electrode is formed on a substrate, e.g., a glass, plastic or silicon body. If the liquid crystal cell is used in a transmissive display, then the substrates and electrodes are formed of a transparent material. If the liquid crystal cell is used in a reflective display, then one of the substrates may be formed of an opaque material and one of the electrodes may be formed of a reflective material. Referring to FIG. 1B, one of the substrates of the liquid crystal cell may be formed with an active matrix, i.e., an array of pixel elements in which each pixel is individually controlled by a transistor switch. The active matrix has an active area within which an image may be generated.

When a voltage is applied across the liquid crystal material, the alignment of the liquid crystal molecules is reoriented so that the optical characteristics of the liquid crystal material change. For example, the liquid crystal material may change from a transmissive state to a scattering state.

One type of liquid crystal cell uses a liquid crystal material which is encapsulated in or dispersed in a containment medium such as a polymer. Encapsulated liquid crystal structures and their preparation are disclosed in U.S. Pat. Nos. 4,435,047 (1984), 4,606,611 (1986), 4,616,903 (1986), and 4,707,080 (1987), all to Fergason; published European patent application EP 156,615 (1985), by Pearlman et al.; U.S. Pat. No. 4,671,618 (1987), to Wu et al.; U.S. Pat. Nos. 4,673,255 (1987) and 4,685,771 (1987) to Doane et al.; and published European patent application EP 0,313,053 (1989), by Dainippon Ink and Chemicals; the disclosures of which are incorporated herein by reference. The containment medium has discrete volumes which contain the liquid crystal material. The discrete volumes may be irregularly shaped and interconnected.

A variety of methods have been used to apply a layer of encapsulated liquid crystal material to a substrate-electrode combination and to pattern the layer of encapsulated liquid crystal material. Patterning removes portions of the encapsulated liquid crystal material so that the layer pattern, for example, matches the size and shape of the active area of the active matrix. This is advantageous for cell-sealing processes. It is more economical to deposit and subsequently pattern a continuous layer of encapsulated liquid crystal material than to coat the substrate with individual regions of encapsulated liquid crystal material. Thus, patterning is used to generate discrete regions of encapsulated liquid crystal material from a continuous layer. The dimensions of the regions of liquid crystal material must also be precisely controlled to obtain high yields in the manufacture of liquid crystal cells.

One method of applying the encapsulated liquid crystal coating to the substrate-electrode combination is to prepare an emulsion containing a liquid crystal material, a containment material and a carrier material. A layer of this emulsion is then deposited onto the substrate-electrode combination and allowed to dry. Once the emulsion has dried and formed the encapsulated liquid crystal layer, the layer may be patterned by mechanically removing the coating with a scraping instrument, e.g., a razor blade.

Another method of depositing and simultaneously patterning the encapsulated liquid crystal layer onto the substrate-electrode combination is disclosed in U.S. Pat. No. 5,328,580 (1994). The encapsulated liquid crystal coating is electrodeposited by submerging the substrate-electrode combination in an electrodeposition medium and applying a voltage to the electrode. The encapsulated liquid crystal layer accumulates only on the electrode, thereby forming a pattern which matches the electrode.

SUMMARY OF THE INVENTION

In one aspect, the present invention is directed to a method of patterning an encapsulated liquid crystal material. A fixture having a recess surrounded by an edge portion is placed into contact with a layer of encapsulated liquid crystal material, and a seal is formed at the edge portion to define a masked region. Then the encapsulated liquid crystal material outside of the masked region is removed.

Implementations of the invention include the following features. The edge portion may include a raised ridge having a tip which contacts the liquid crystal material. A vacuum may be applied to the recess to form the seal. Alternatively, encapsulated liquid crystal material may be formed on a surface, and the fixture may be clamped to the surface to form the seal. The encapsulated liquid crystal material may be dissolved by a solvent.

In general, in another aspect, the invention is directed to a fixture for patterning an encapsulated liquid crystal material. The fixture has a main body portion. A raised ridge projects from the main body portion to form an edge portion for contacting a layer of encapsulated liquid crystal material. A recess is defined by the main body portion and the ridge.

Implementations of the invention include the following features. The raised ridge may have a tip which contacts the liquid crystal material, and the tip may be formed of a resilient material. A passage may connect the recess to an external surface of the fixture. The fixture may have a plurality of recesses and a plurality of seals may be formed at the edge portions to define a plurality of masked regions. The fixture may be formed of a resilient material, and a manifold may be embedded in the fixture. A plurality of passages may connect the recesses to the manifold, and a vacuum pump may be connected to the manifold. An apparatus with the fixture may include a bath containing a solvent to dissolve the encapsulated liquid crystal material outside of the masked region.

The advantages of the invention include the following. A patterned layer of encapsulated liquid crystal layer of uniform thickness may be formed on an electrode-substrate combination at a relatively low cost and with a high throughput. The patterned layer is formed without creating a raised lip near the edge of the pattern. Thus, no air pocket is created when two plates of a liquid crystal cell are laminated together. By eliminating the air pocket, the present invention allows for a larger voltage drop across the encapsulated liquid crystal layer (so that the device may be driven at lower voltages), increases the optical uniformity of the liquid crystal cell, and strengthens the attachment of the laminated plate to the encapsulated liquid crystal layer.

Additional objects and advantages of the invention will be set forth in the description which follows, and in part will be obvious from the description, or may be learned by practice of the invention. The objects and advantages of the invention may be realized by means of the instrumentalities and combinations particularly pointed out in the claims.

BRIEF DESCRIPTION OF THE DRAWING(S)

The accompanying drawings, which are incorporated in and constitute a part of the specification, schematically illustrate the present invention, and together with the general description given above and the detailed description given below, serve to explain the principles of the invention.

FIGS. 2A–2G are schematic illustrations of steps in the process of forming a patterned encapsulated liquid crystal layer according to the present invention.

FIG. 3A is a schematic top view of a mask used in the process of FIGS. 2A–2G.

FIG. 3B is a schematic bottom view of the mask of FIG. 3A.

FIG. 3C is a schematic cross-sectional view of the mask of FIG. 3A.

FIGS. 6A–6B are schematic illustrations of steps in the process of forming a patterned encapsulated liquid crystal layer using the mask of FIG. 5A.

DESCRIPTION OF THE PREFERRED EMBODIMENTS

Figures 1A, 1B:
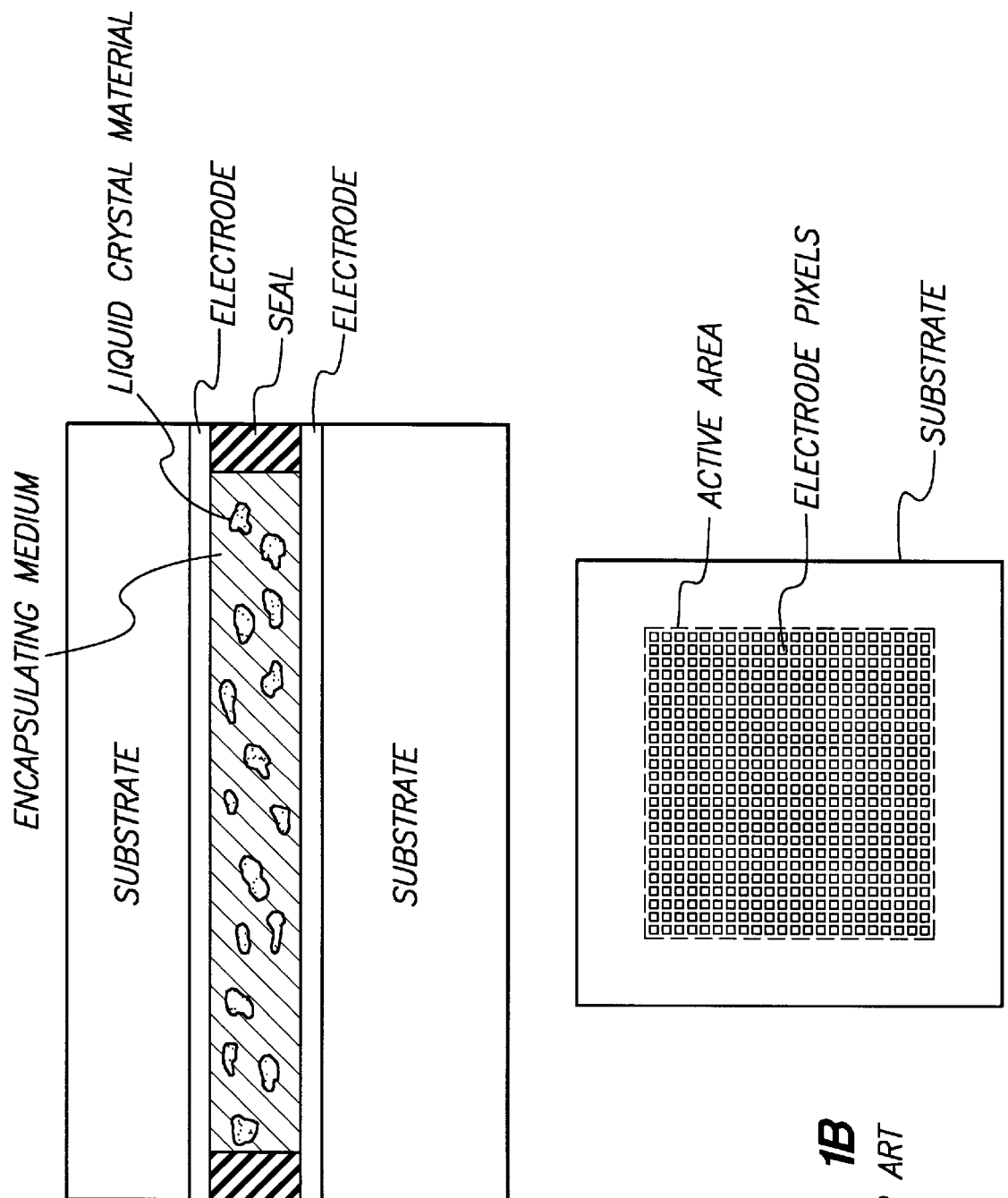
FIG. 1A is a schematic cross-sectional view of a prior art encapsulated liquid crystal device.
FIG. 1B is a schematic top view of the liquid crystal device of FIG. 1A.

The method of the present invention is illustrated in FIGS. 2A–2G. Referring to FIG. 2A, a layer of encapsulated liquid crystal material will be applied to a substrate-electrode combination 10. Substrate-electrode combination 10 includes a substrate 12 on which an electrode 14 has been formed. The substrate-electrode combination may be the front plate or back plate of a liquid crystal cell. If the substrate-electrode combination is the front plate, then substrate 12 and electrode 14 are transparent. For example, substrate 12 may be glass or plastic, and electrode 14 may be indium tin oxide (ITO). The electrode 14 may be a common electrode in the completed liquid crystal cell.

Referring to FIG. 2B, a layer 16 of encapsulated liquid crystal material is formed on substrate-electrode combination 10. Specifically, an emulsion of the liquid crystal material and the encapsulating medium is cast onto substrate-electrode combination 10 to form a continuous layer of substantially uniform thickness. Then the emulsion is allowed to dry to form encapsulated liquid crystal layer 16 of substrate-electrode combination 10.

The liquid crystal material may be nematic or operationally nematic, and may have a positive dielectric anisotropy. Alternately, the liquid crystal material may be smectic or chiral nematic. In addition, a pleochroic dye may be dissolved in the liquid crystal material. Specifically, the liquid crystal material may be the type discussed in the above mentioned U.S. Pat. No. 4,435,047 or U.S. Pat. No. 4,688,900.

The encapsulating medium for the liquid crystal material is preferably a polymeric material. Suitable encapsulating media include, but are not limited to, gelatin, polyurethane, polyethylene oxide, polyvinyl pyrrolidone, cellulosic polymers, natural gums, acrylic and methacrylic copolymers, epoxies, polyolefins, vinyl polymers, aqueous lattices, and the like. In particular, the encapsulating medium may be polyvinyl alcohol or a polyurethane latex.

Referring to FIG. 2C, a fixture or mask 20 is positioned over substrate-electrode combination 10. Substrate 12 may be vacuum-chucked to an x-y table (not shown) and aligned with mask 20. Alignment ensures that mask 20 is positioned above the center of substrate-electrode combination 10. Alternately, mask 20 may be connected to an alignment fixture (not shown) to accomplish the same thing.

Referring to FIGS. 3A–3C, mask 20 includes a rectangular main body 22 having a ridge 24 which projects downwardly from a bottom surface 23 of the main body. The ridge 24 may have a triangular cross-section with a narrow tip 25. Mask 20 may be formed of a resilient and somewhat flexible material such as rubber, silicone or polyurethane. Mask 20 may be made by filling a machined mold with a two-part mixture of a monomer and a curing agent. The monomer is then polymerized to form a cross-linked polymer. This mixture may be purchased from GE Plastics of Pittsfield, Massachusetts under the product name RTV630, or from BJB Enterprises of Garden Grove, Calif. under the product name TC5050. The polymer 20 is cured by exposure to heat or UV radiation.

Alternately, main body portion 22 and ridge 24 may be formed of a rigid material and tip 25 may be formed of a flexible material. For example, main body portion 22 and ridge 24 may be a machined aluminum body, and a material, such as Teflon™ PTFE, may be attached to ridge 24 to provide a slightly flexible or deformable tip 25.

Narrow tip 25 of ridge 24 is configured to contact the encapsulated liquid crystal layer 16 in as small an area as possible. Ridge 24 may have a right triangular cross-section and may be approximately one-quarter of an inch in height. The size and shape of the footprint of ridge 24 will depend upon the pattern or region required for encapsulated liquid crystal layer 16. A rectangular liquid crystal layer has been fabricated by means of mask 20 with dimensions of approximately one inch by one and one-half inches.

As shown most clearly in FIG. 3C, a molded-in fitting 26 is formed in an upper surface 28 of mask 20. A passage 30 in main body 22 connects bottom surface 23 of the mask to fitting 26, or, as shown in FIG. 2C, the fitting may extend through main body 22, eliminating the need for the passage. Fitting 26 is connected by a vacuum hose 32 to a vacuum pump 33 (see FIGS. 3A–3C). The mask 20 may be connected to a vertical-actuating mechanism (not shown) to move the mask up and down relative to substrate-electrode combination 10. The vertical actuating mechanism may be an air cylinder.

As shown by FIGS. 2D and 3C, mask 20 is lowered by the vertical actuating mechanism toward substrate-electrode combination 10 until tip 25 of ridge 24 contacts the encapsulated liquid crystal layer 16. The footprint of the mask, i.e., the area where tip 25 contacts liquid crystal layer 16, should be as small as possible to prevent damage to the encapsulated liquid crystal layer. The size and shape of the footprint are defined by the dimensions and configuration of the tip of the ridge, and they depend on the intended application of the liquid cell being fabricated.

Once mask 20 is in contact with substrate-electrode combination 10, vacuum pump 33 is activated, and a vacuum is applied through vacuum hose 32 and fitting 26 to generate an evacuated volume 36 between bottom surface 23 of main body 22 and substrate-electrode combination 10. As a result, substrate-electrode combination 10 is vacuum-chucked to mask 20, and a vacuum seal 34 is established between the lower edge of ridge 24 or tip 25 and substrate-electrode combination 10. Vacuum seal 34 defines a masked area 40 in the encapsulated liquid crystal within evacuated volume 36 and an unmasked area 42 outside of evacuated volume 36.

As shown in FIG. 2E, the entire assembly, including mask 20 and vacuum-chucked substrate-electrode combination 10, is placed in a wash-off apparatus 50. In wash-off apparatus 50, substrate-electrode combination 10 is submerged in a bath of a solvent 52. Solvent 52 dissolves or removes the exposed regions of encapsulated liquid crystal coating 16 in unmasked area 42. Vacuum seal 34 is sufficiently fluid-tight such that solvent 52 is not drawn into evacuated volume 36. Solvent 52 does not affect the material of mask 20, substrate 12 or electrode 14. Solvent 52 may be an organic solvent such as n-methyl pyrrolidone or dimethyl sulfoxide, or an aqueous solution of potassium hydroxide. Solvent 52 may be heated or ultrasonically agitated to increase the removal rate of the liquid crystal material. Additional chemical agents may be added to the solvent to increase the removal rate. Substrate-electrode combination 10 may be placed in solvent 52 for approximately five minutes.

In the context of this specification, the use of "solvent," "dissolve," and other terms of like import with reference to the encapsulated liquid crystal material does not mean that both the liquid crystal material and the containment medium must be soluble in the solvent in the strict chemical sense (although such a possibility is not excluded). Rather, these terms are used to mean that the solvent dissolves, disbonds, washes away, hydrolyzes, degrades, erodes, or otherwise removes the encapsulated liquid crystal material from the substrate. For example, a solvent may dissolve the containment medium only and not be a solvent for the liquid crystal, but, as a result of the dissolution of the containment medium, the exposed liquid crystal material is washed away. Thus, preferably, the solvent preferably is a liquid which is capable of dissolving the containment medium (or converting it into a form which is soluble) and optionally is also capable of dissolving the liquid crystal material.

Referring to FIG. 2F, once the encapsulated liquid crystal material in unmasked area 42 has been dissolved, the assembly is removed from the bath and dried. Substrate-electrode combination 10 may be easily manipulated by means of mask 20 due to the vacuum attachment.

Referring to FIG. 2G, after substrate electrode combination 10 is dried, the vacuum is released, and mask 20 is removed. The result is a liquid crystal layer 16' having a well defined pattern, which is based on the configuration of the mask. The edges of the pattern are sharp, straight and closely match the size and shape of ridge 24. Because ridge 24 has a sharp edge, only a thin strip of the encapsulated liquid crystal layer is damaged by contact with mask 20. The ridge may contact the liquid crystal layer along a small strip having a width of only 0.25 millimeters.

Figure 4A:
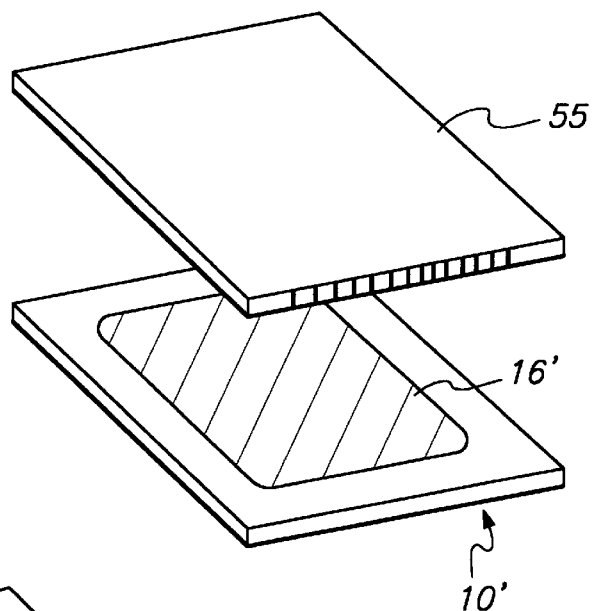
FIGS. 4A–4C are schematic illustrations of steps in the process of laminating and sealing a liquid crystal cell.
Figure 4B:
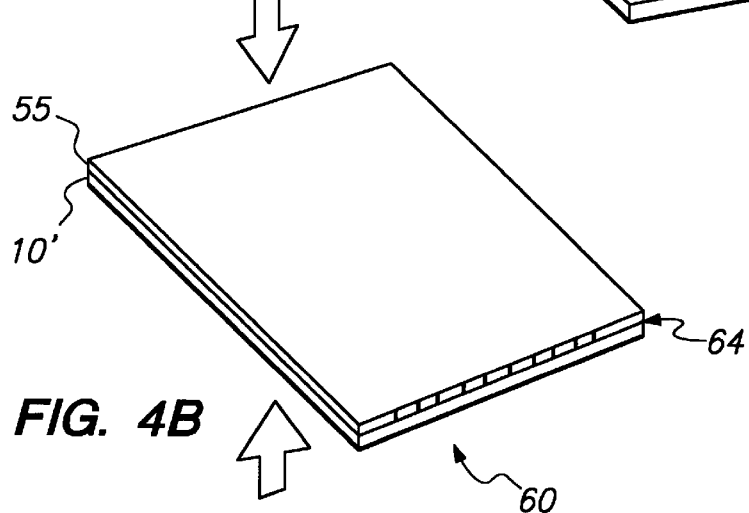
Figure 4C:
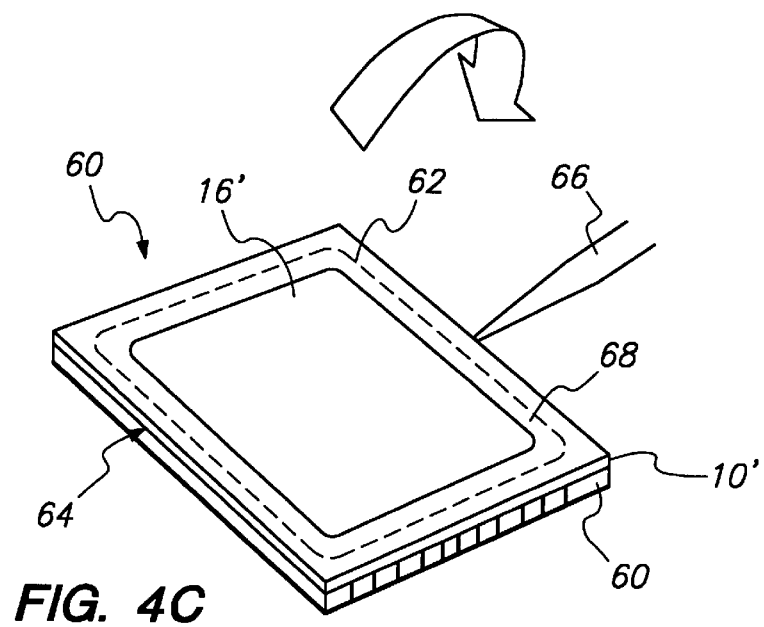

FIGS. 4A–4C illustrate the steps of laminating and sealing an uncoated substrate-electrode combination 55 to coated substrate-electrode combination 10 to create a liquid crystal cell 60. Preferably, uncoated substrate-electrode combination 55 is the back plate, i.e., the light reflecting side, of a reflective liquid crystal cell. For example, substrate-electrode combination 55 may be a complementary metal-oxide semiconductor (CMOS) chip having an active matrix constructed thereon. Uncoated substrate-electrode combination 55 may have an array of reflective electrodes or a reflective layer positioned behind an array of non-reflective electrodes.

Referring to FIG. 4A, coated substrate-electrode combination 10 may be moved to a station for lamination and sealing before mask 20 is detached. At this station, coated substrate-electrode combination 10 and uncoated substrate-electrode combination 55 are aligned so that the active area of the uncoated substrate-electrode combination matches the patterned liquid crystal layer. The art, substrate-electrode combination 10 and substrate-electrode combination 55 may be aligned with an alignment jig (not shown) which vacuum-chucks both substrates to movable vacuum plates. Alignment ensures that the pattern of the liquid crystal layer 16' matches the electrically-active area of substrate-electrode combination 55 once the two plates have been laminated together. As shown in FIG. 4B, the final product is liquid crystal cell 60.

Referring now to FIG. 4C, once uncoated substrate-electrode combination 55 and coated substrate-electrode combination 10 have been laminated together, liquid crystal layer 16' is still exposed to the environment at an open edge 64 of the liquid crystal cell. Therefore, liquid crystal cell 60 must be sealed. Specifically, a sealant material 62 is injected into the open edge of the liquid crystal cell by a sealant dispenser 66. Capillary action causes the sealant material to fill this open edge and completely surround patterned liquid crystal layer 16'. Then the sealant material is cured by exposure to heat or UV radiation. An air gap 68 may separate encapsulated liquid crystal layer 16' from sealant material 62.

Because only a thin strip of the encapsulated liquid crystal layer is damaged by contact with mask 20, the patterned layer is formed without creating a raised lip near the edge of the pattern. (It has been discovered that such a raised lip is often associated with patterning by mechanical removal). Thus, no air pocket is created between substrate-electrode combination 10 and substrate-electrode combination 55 when the liquid crystal cell is laminated together. By eliminating the air pocket, the present invention allows for an increased voltage drop across the encapsulated liquid crystal layer (so that the device may be driven at lower voltages). The present invention also provides an increase in the optical uniformity of the liquid crystal cell and strengthens the bond between the two substrate-electrode combinations that have been laminated together.

Figure 5A:
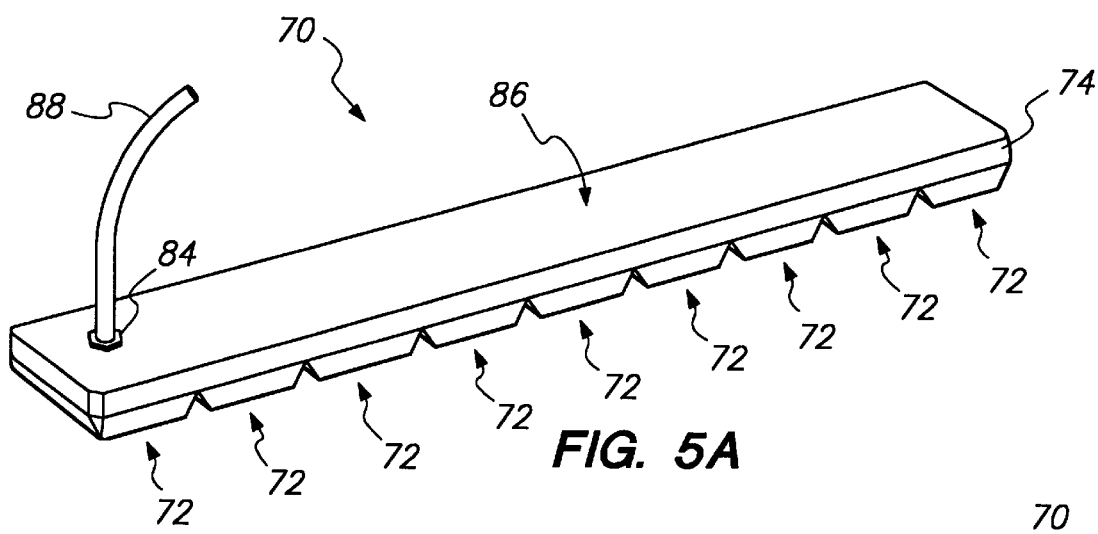
FIG. 5A is a schematic view of a gasket having multiple masks for use in forming a patterned encapsulated liquid crystal layer according to the present invention.
Figure 5B:
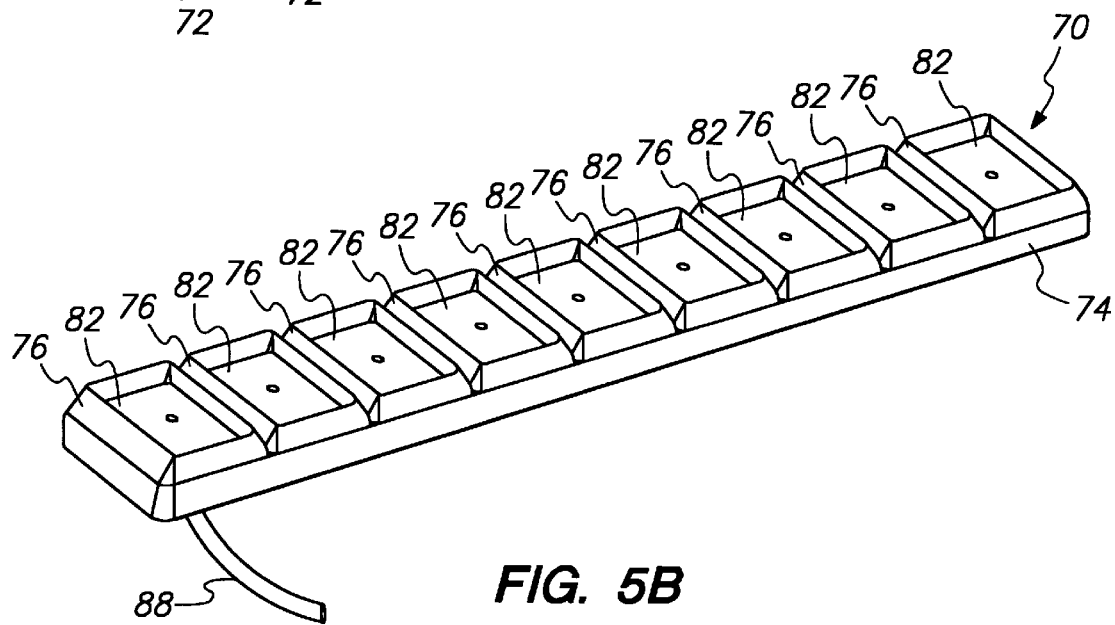
FIG. 5B is a bottom view of the gasket of FIG. 5A.
Figure 5C:
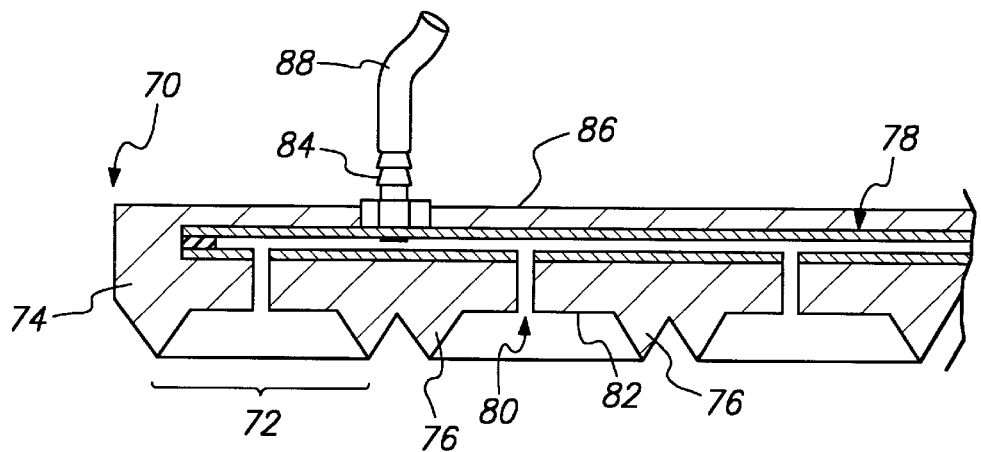
FIG. 5C is a partial cross-sectional view of the gasket of FIG. 5A.

As shown in FIGS. 5A–5C, in another embodiment, a gasket 70 includes a rectangular main body 74 and a plurality of ridges 76 which project downwardly from main body 74 to form masks 72. Masks 72 are similar to masks 20, and gasket 70 may be formed of a material similar to that of mask 20. Although FIGS. 5A and 5B show gasket 70 as having a row nine masks, it is possible for gasket 70 to comprise a different number of masks. For example, a gasket having a matrix of sixty-eight masks has been fabricated, and gaskets having even more masks could be fabricated to scale-up the patterning process.

As shown most clearly in FIG. 5C, a manifold 78 is formed in main body 74 of gasket 70. Manifold 78 may be made of metal to increase the rigidity of gasket 70. A channel 80 connects a bottom surface 82 of each mask 72 to manifold 78. Manifold 78 is connected to a fitting 84 which is formed in a top surface 86 of the gasket. The fitting connects the manifold to a vacuum hose 88, which is, in turn, connected to a vacuum pump (not shown). Manifold 78 acts as a common line to apply a vacuum to each mask.

Figure 6A:
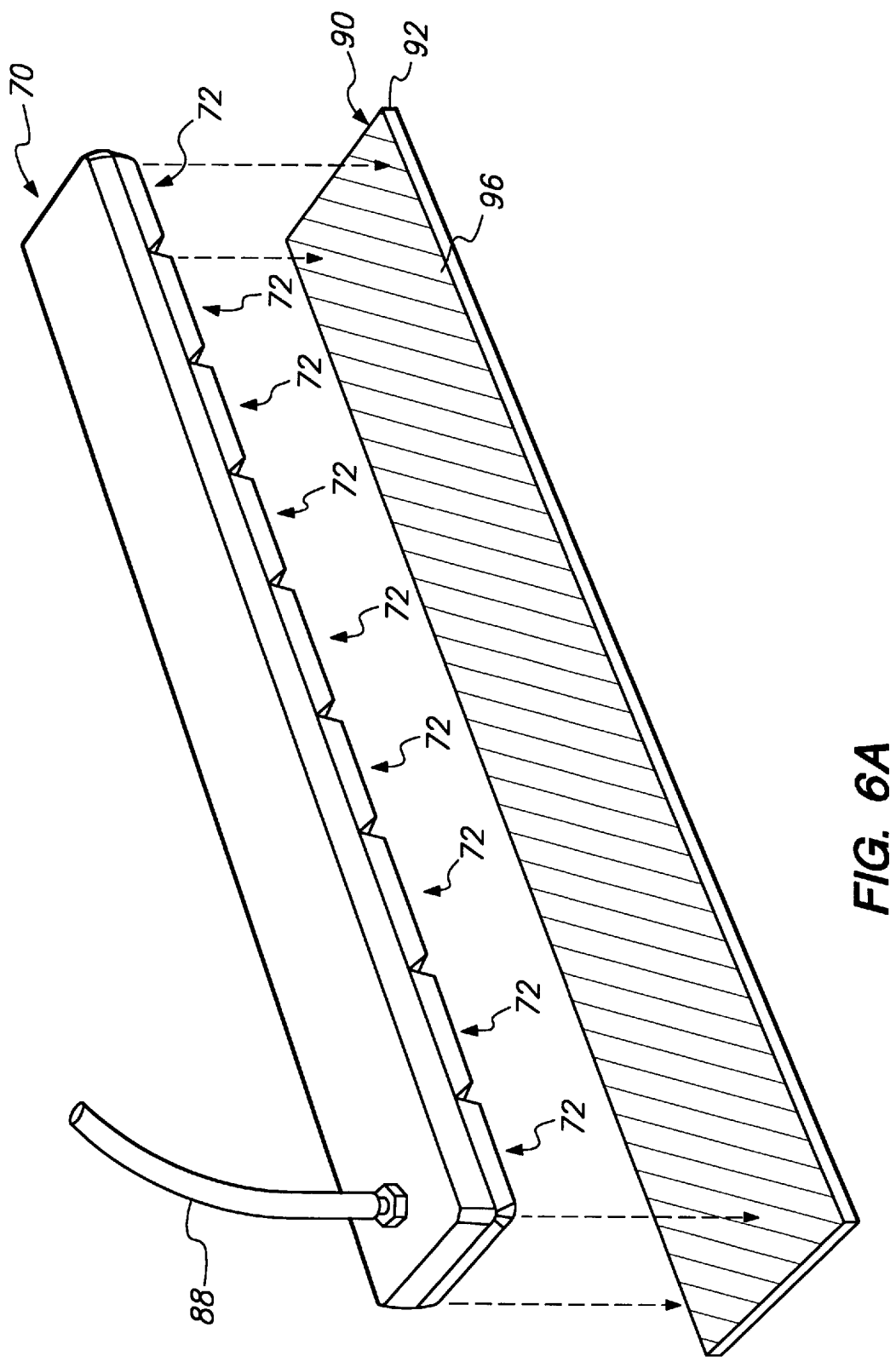

Gasket 70 is used in much the same manner as mask 20. However, gasket 70 may be used to simultaneously create multiple regions of encapsulated liquid crystal material. As shown in FIG. 6A, gasket 70 is positioned above a substrate-electrode combination 90 that has been coated with a continuous layer 96 of encapsulated liquid crystal material. Gasket 70 is lowered by a vertical actuating mechanism (not shown) to bring the tips of ridges 76 into contact with liquid crystal layer 96. A vacuum is applied through vacuum hose 88, manifold 78 and channels 80 to suction substrate-electrode combination 90 to gasket 70. Then, as described above, the entire assembly is submerged in a solvent which dissolves the exposed portions of the encapsulated liquid crystal layer. As shown in FIG. 6B, after the assembly has been removed from the wash-off apparatus, the vacuum is released and the gasket is lifted from substrate-electrode combination 90. The unmasked regions of encapsulated liquid crystal layer 96 are dissolved, leaving a row or matrix of encapsulated liquid crystal material regions 96'.

In order to create individual substrate-electrode combinations 10, substrate-electrode combination 90 may be scribed and broken. This may be done while it is vacuum-chucked to gasket 70. Each resulting substrate-electrode combination 10 is thus vacuum-chucked to the gasket. Each substrate-electrode combination 10 may be then laminated to an uncoated substrate-electrode combination 55 and sealed. Alternately, substrate-electrode combination 90 may be released from gasket 70 and uncoated substrate-electrode combinations 55 may be laminated to each region 96' of encapsulated liquid crystal material. In this alternative operation, substrate-electrode combination 90 is scribed and broken only after each uncoated substrate-electrode combination 55 has been laminated to the proper location on substrate-electrode combination 90.

Although gasket 70 is described as having one manifold 78, this is not required. For example, there may be multiple manifolds to provide control of the vacuum applied to groups of masks, or there may be a fitting for each mask 72 to provide independent control of the vacuum applied to each mask 72. In addition, although gasket 70 is shown as a single fixture, gasket 70 could consist of multiple independently-actuated masks. For example, each mask in gasket 70 could be movably connected to the adjacent masks and individually controlled by a vertical-actuating mechanism. In the event of warpage of the substrate-electrode combination or gasket so that the substrate-electrode combination or gasket is not planar, different masks in gasket 70 may need to move different vertical distances in order to contact encapsulated liquid crystal layer 16 to form a seal. Thus, the independently-actuated masks provide for improved sealing in the event of warpage.

In addition, although the process has been described with reference to the application of a vacuum to vacuum chuck the coated substrate-electrode combination to the gasket, the same effect could be accomplished by a mechanical connector, e.g., a clamp. A clamp could couple gasket 70 to the coated substrate-electrode combination to form a seal to protect the masked regions of encapsulated liquid crystal layer 96. Furthermore, although the process has been described with reference to a solvent, there may be other processes to remove the unmasked area of the encapsulated liquid crystal layer, such as plasma etching, laser etching or micro-sandblasting.

The present invention has been described in terms of a preferred embodiment. The invention, however, is not limited to the embodiment depicted and described. Rather, the scope of the invention is defined by the appended claims.

Further, the foregoing detailed description of the invention includes passages which are chiefly or exclusively concerned with particular parts or aspects of the invention. It is to be understood that this is for clarity and convenience, that a particular feature may be relevant in more than just passage in which it is disclosed, and that the disclosure herein includes all the appropriate combinations of information found in the different passages. Similarly, although the various figures and descriptions thereof relate to specific embodiments of the invention, it is to be understood that where a specific feature is disclosed in the context of a particular figure, such feature can also be used, to the extent appropriate, in the context of another figure, in combination with another feature, or in the invention in general.

What is claimed is:

1. A method of patterning an encapsulated liquid crystal material, comprising the steps of:

placing a fixture having a recess surrounded by an edge portion into contact with a layer of encapsulated liquid crystal material;

forming a seal at the edge portion to define a masked region; and removing the encapsulated liquid crystal material outside of the masked region.

2. The method of claim 1 wherein the step of placing the fixture comprises contacting the layer of encapsulated liquid crystal material with a tip of a raised ridge of the edge portion.

3. The method of claim 1 wherein the step of forming the seal comprises applying a vacuum to the recess.

4. The method of claim 1 wherein the step of removing the liquid crystal includes dissolving the encapsulated liquid crystal material outside of the masked region with a solvent.

5. A method of patterning an encapsulated liquid crystal material, comprising the steps of:

placing a fixture having a plurality of recesses surrounded by edge portions into contact with a layer of encapsulated liquid crystal material;

forming seals at the edge portions of the fixture to define a plurality of masked regions; and removing the encapsulated liquid crystal material outside the masked regions.

6. A method of patterning an encapsulated liquid crystal material, comprising the steps of:

placing a mask having a recess surrounded by an edge portion into contact with a layer of encapsulated material;

forming a seal between the edge portion and the surface to define a masked region; and dissolving the encapsulated liquid crystal material outside of the masked region with a solvent.

7. The method of claim 6 wherein the step of forming a seal comprises applying a vacuum to the recess.

8. The method of claim 6 wherein the layer of liquid crystal material is formed on a surface, and the step of forming a seal comprises clamping the fixture to the surface.

9. The method of claim 6 further comprising the step of aligning the fixture with the surface.

10. An apparatus for patterning an encapsulated liquid crystal layer, comprising:

a fixture having at least one recess surrounded by an edge portion for contacting a layer of encapsulated liquid crystal material;

means for forming a seal at the edge portion to define a masked region; and a bath containing a solvent to dissolve the encapsulated liquid crystal material outside of the masked region.

11. The apparatus of claim 10 further comprising a vacuum pump connected to a passage between the recess and an external surface of the fixture to apply a vacuum to the recess.

12. An apparatus according to claim 10, wherein:

the fixture having a plurality of recesses surrounded by a plurality of edge portions for contacting a layer of encapsulated liquid crystal material; and the means for forming a seal forms a plurality of seals at the plurality of edge portions to define a plurality of masked regions.

13. The apparatus of claim 12 wherein the fixture is formed of a resilient material, and a manifold is encased in the fixture.

14. The apparatus of claim 13 further comprising a plurality of passages connecting the recesses to the manifold.

15. The apparatus of claim 14 further comprising a vacuum pump connected to the manifold.

* * * * *